United States Patent
Takekoshi et al.

(10) Patent No.: US 7,230,044 B2
(45) Date of Patent: *Jun. 12, 2007

(54) INTIMATE PHYSICAL MIXTURES CONTAINING MACROCYCLIC POLYESTER OLIGOMER AND FILLER

(75) Inventors: Tohru Takekoshi, Scotia, NY (US); Steven R. Bahr, Schenectady, NY (US); Steven J. Winckler, Troy, NY (US)

(73) Assignee: Cyclics Corporation, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/260,509

(22) Filed: Oct. 27, 2005

(65) Prior Publication Data

US 2006/0122307 A1 Jun. 8, 2006

Related U.S. Application Data

(63) Continuation of application No. 10/859,784, filed on Jun. 3, 2004, now Pat. No. 6,960,626, which is a continuation-in-part of application No. 10/408,753, filed on Apr. 7, 2003, now Pat. No. 6,994,914, which is a continuation of application No. 10/195,853, filed on Jul. 15, 2002, now Pat. No. 6,639,009, which is a continuation of application No. 09/754,943, filed on Jan. 4, 2001, now Pat. No. 6,420,047, which is a continuation-in-part of application No. 09/535,132, filed on Mar. 24, 2000, now Pat. No. 6,369,157.

(60) Provisional application No. 60/530,942, filed on Dec. 19, 2003, provisional application No. 60/177,727, filed on Jan. 21, 2000.

(51) Int. Cl.
    C08K 3/00 (2006.01)
    C08K 3/34 (2006.01)

(52) U.S. Cl. .................. 524/175; 524/178; 524/399; 524/413; 524/442; 524/744; 524/783; 524/789

(58) Field of Classification Search ................ 524/175, 524/178, 399, 413, 442, 783, 744, 789
See application file for complete search history.

(56) References Cited

U.S. PATENT DOCUMENTS

| | | |
|---|---|---|
| 2,628,171 A | 2/1953 | Green |
| 3,018,272 A | 1/1962 | Griffing et al. |
| 3,090,753 A | 5/1963 | Matuszak et al. |
| 3,786,067 A | 1/1974 | Throckmorton et al. |
| 3,859,246 A | 1/1975 | Jackson et al. |
| 4,140,669 A | 2/1979 | Phipps, Jr. et al. |
| 4,559,262 A | 12/1985 | Cogswell et al. |
| 4,568,703 A | 2/1986 | Ashida |
| 4,590,259 A | 5/1986 | Kosky et al. |
| 4,605,731 A | 8/1986 | Evans et al. |
| 4,616,077 A | 10/1986 | Silva |
| 4,638,077 A | 1/1987 | Brunelle et al. |
| 4,644,053 A | 2/1987 | Brunelle et al. |
| 4,680,345 A | 7/1987 | Kobayashi et al. |
| 4,727,134 A | 2/1988 | Brunelle et al. |
| 4,740,583 A | 4/1988 | Brunelle et al. |
| 4,757,132 A | 7/1988 | Brunelle et al. |
| 4,785,060 A | 11/1988 | Nagler |
| 4,803,288 A | 2/1989 | Kitamura et al. |
| 4,816,548 A | 3/1989 | Evans et al. |
| 4,829,144 A | 5/1989 | Brunelle et al. |
| 4,831,001 A | 5/1989 | Evans et al. |
| 4,888,411 A | 12/1989 | Shannon et al. |
| 4,889,885 A | 12/1989 | Usuki et al. |
| 4,900,706 A | 2/1990 | Sasaki et al. |
| 4,904,810 A | 2/1990 | Brunelle et al. |
| 4,909,846 A | 3/1990 | Barfurth et al. |
| 4,960,915 A | 10/1990 | Thiele et al. |
| 4,980,453 A | 12/1990 | Brunelle et al. |
| 4,992,228 A | 2/1991 | Heck et al. |
| 4,999,420 A | 3/1991 | Leitz et al. |
| 5,006,637 A | 4/1991 | Guggenheim et al. |
| 5,019,450 A | 5/1991 | Cogswell et al. |
| 5,023,346 A | 6/1991 | Schon et al. |

(Continued)

FOREIGN PATENT DOCUMENTS

BE        676324        6/1966

(Continued)

OTHER PUBLICATIONS

Ahjopalo, L. et al. (2000) "Cyclic Oligomers in Saturated Polyesters" Polymer, vol. 41, No. 23, 8283-8290.

(Continued)

Primary Examiner—Irina S. Zemel
(74) Attorney, Agent, or Firm—Goodwin Procter LLP

(57) ABSTRACT

The invention provides intimate physical mixtures of macrocyclic polyester oligomer (MPO) and filler, as well as methods for their preparation and use. Improved dispersion of filler in a polymer matrix is achieved upon polymerization, and larger amounts of filler with high aspect ratio can be used. In one aspect, the invention provides mixtures of MPO with magnesium silicate. In another aspect, the invention provides a mixture of MPO, filler, and polymerization catalyst as a one-part, ready-to-polymerize material with a long shelf life. The one-part material can be used, for example, in the manufacture of parts without modification of existing processing equipment.

18 Claims, 3 Drawing Sheets

U.S. PATENT DOCUMENTS

| | | |
|---|---|---|
| 5,039,717 A | 8/1991 | Kawakami et al. |
| 5,039,783 A | 8/1991 | Brunelle et al. |
| 5,071,711 A | 12/1991 | Heck et al. |
| 5,095,088 A | 3/1992 | Wang |
| 5,097,008 A | 3/1992 | Krabbenhoft et al. |
| 5,116,900 A | 5/1992 | Flautt et al. |
| 5,191,013 A | 3/1993 | Cook et al. |
| 5,191,038 A | 3/1993 | Krabbenhoft et al. |
| 5,202,386 A | 4/1993 | Hogt et al. |
| 5,207,850 A | 5/1993 | Parekh |
| 5,214,158 A | 5/1993 | Brunelle et al. |
| 5,225,129 A | 7/1993 | van den Berg |
| 5,231,161 A | 7/1993 | Brunelle et al. |
| 5,237,042 A | 8/1993 | Kim et al. |
| 5,241,880 A | 9/1993 | Mizobata et al. |
| RE34,431 E | 11/1993 | Brunelle et al. |
| 5,264,548 A | 11/1993 | Brunelle et al. |
| 5,281,669 A | 1/1994 | Kambour et al. |
| 5,288,837 A | 2/1994 | Munjal et al. |
| 5,300,392 A | 4/1994 | Odell et al. |
| 5,300,393 A | 4/1994 | Odell et al. |
| 5,300,590 A | 4/1994 | Cook et al. |
| 5,302,484 A | 4/1994 | Odell et al. |
| 5,314,779 A | 5/1994 | Odell et al. |
| 5,321,117 A | 6/1994 | Brunelle |
| 5,340,909 A | 8/1994 | Doerr et al. |
| 5,348,985 A | 9/1994 | Pearce et al. |
| 5,356,984 A | 10/1994 | Carbone et al. |
| 5,386,037 A | 1/1995 | Takekoshi et al. |
| 5,387,666 A | 2/1995 | Takekoshi et al. |
| 5,389,719 A | 2/1995 | Takekoshi et al. |
| 5,407,984 A | 4/1995 | Brunelle et al. |
| 5,410,014 A | 4/1995 | Haese et al. |
| 5,420,226 A | 5/1995 | Hamer et al. |
| 5,434,244 A | 7/1995 | Warner et al. |
| 5,446,122 A | 8/1995 | Warner et al. |
| 5,466,744 A | 11/1995 | Evans et al. |
| 5,498,651 A | 3/1996 | Brunelle |
| 5,516,879 A | 5/1996 | Yuo et al. |
| 5,519,108 A | 5/1996 | Yuo et al. |
| 5,527,976 A | 6/1996 | Takekoshi et al. |
| 5,530,052 A | 6/1996 | Takekoshi et al. |
| 5,591,800 A | 1/1997 | Takekoshi et al. |
| 5,605,979 A | 2/1997 | Priddy, Jr. et al. |
| 5,637,655 A | 6/1997 | Priddy, Jr. et al. |
| 5,646,306 A | 7/1997 | Elsasser, Jr. |
| 5,648,454 A | 7/1997 | Brunelle |
| 5,654,395 A | 8/1997 | Jackson et al. |
| 5,661,214 A | 8/1997 | Brunelle et al. |
| 5,663,282 A | 9/1997 | Todt et al. |
| 5,668,186 A | 9/1997 | Brunelle et al. |
| 5,693,722 A | 12/1997 | Priddy, Jr. et al. |
| 5,700,888 A | 12/1997 | Hall |
| 5,707,439 A | 1/1998 | Takekoshi et al. |
| 5,710,086 A | 1/1998 | Brunelle et al. |
| 5,736,621 A | 4/1998 | Simon et al. |
| 5,756,644 A | 5/1998 | Hodge et al. |
| 5,760,161 A | 6/1998 | Goins, Jr. et al. |
| 5,786,440 A | 7/1998 | Kohler et al. |
| 5,795,423 A | 8/1998 | Johnson |
| 5,830,541 A | 11/1998 | Carswell et al. |
| 5,849,830 A | 12/1998 | Tsipursky et al. |
| 5,869,586 A | 2/1999 | Riedel et al. |
| 5,936,029 A | 8/1999 | Hall |
| 5,952,455 A | 9/1999 | Yanagisawa et al. |
| 5,968,642 A | 10/1999 | Saito |
| 6,080,834 A | 6/2000 | Putzig et al. |
| 6,084,019 A | 7/2000 | Matayabas, Jr. et al. |
| 6,093,765 A | 7/2000 | Cottis et al. |
| 6,121,466 A | 9/2000 | Osterholt et al. |
| 6,124,412 A | 9/2000 | Bin-Taleb et al. |
| 6,127,436 A | 10/2000 | Chatterjee et al. |
| 6,162,857 A | 12/2000 | Trexler, Jr. et al. |
| 6,284,868 B1 | 9/2001 | Geprags et al. |
| 6,297,330 B1 | 10/2001 | Burch, Jr. et al. |
| 6,353,030 B1 | 3/2002 | Prikoszovich |
| 6,369,157 B1 | 4/2002 | Winckler et al. |
| 6,376,026 B1 | 4/2002 | Correll et al. |
| 6,414,103 B1 | 7/2002 | Correll et al. |
| 6,420,047 B2 | 7/2002 | Winckler et al. |
| 6,420,048 B1 | 7/2002 | Wang |
| 6,432,486 B1 | 8/2002 | Paris et al. |
| 6,436,548 B1 | 8/2002 | Phelps |
| 6,436,549 B1 | 8/2002 | Wang |
| 6,458,972 B1 | 10/2002 | Surburg et al. |
| 6,525,164 B2 | 2/2003 | Faler |
| 6,586,558 B2 | 7/2003 | Schmidt et al. |
| 6,639,009 B2 | 10/2003 | Winckler et al. |
| 6,646,134 B2 | 11/2003 | Brugel |
| 6,670,429 B2 | 12/2003 | Appelman et al. |
| 6,713,601 B2 | 3/2004 | Phelps |
| 6,806,346 B2 | 10/2004 | Brugel |
| 6,855,798 B2 | 2/2005 | Faler |
| 6,906,147 B2 | 6/2005 | Wang et al. |
| 6,960,626 B2 | 11/2005 | Takekoshi et al. |
| 6,962,968 B2 | 11/2005 | Phelps et al. |
| 6,994,914 B2 | 2/2006 | Winckler et al. |
| 7,022,806 B2 | 4/2006 | Faler |
| 7,071,291 B2 | 7/2006 | Thompson et al. |
| 2002/0028904 A1 | 3/2002 | Dhawan et al. |
| 2002/0137834 A1 | 9/2002 | Barbee et al. |
| 2003/0130477 A1 | 7/2003 | Winckler et al. |
| 2004/0155380 A1 | 8/2004 | Kendall et al. |
| 2004/0188883 A1 | 9/2004 | Barron et al. |
| 2005/0059768 A1 | 3/2005 | Dion et al. |
| 2005/0288176 A1 | 12/2005 | Kuhlman |
| 2005/0288420 A1 | 12/2005 | Paquette |
| 2006/0003887 A1 | 1/2006 | Paquette |
| 2006/0004135 A1 | 1/2006 | Paquette |
| 2006/0025562 A1 | 2/2006 | Dion et al. |

FOREIGN PATENT DOCUMENTS

| | | |
|---|---|---|
| CH | 654 304 A5 | 2/1986 |
| CN | 1120555 | 4/1996 |
| DE | 3607627 | 9/1987 |
| DE | 4034574 A1 | 5/1992 |
| EP | 0000544 B1 | 8/1982 |
| EP | 0153785 A2 | 9/1985 |
| EP | 0 172 636 | 2/1986 |
| EP | 0216496 A2 | 4/1987 |
| EP | 0 273 148 | 7/1988 |
| EP | 0153785 B1 | 7/1989 |
| EP | 0419254 A2 | 3/1991 |
| EP | 0486832 A2 | 5/1992 |
| EP | 0264835 B1 | 6/1992 |
| EP | 0 499 747 | 8/1992 |
| EP | 0235741 B1 | 1/1993 |
| EP | 0543492 A1 | 5/1993 |
| EP | 0566313 A2 | 10/1993 |
| EP | 0589640 A1 | 3/1994 |
| EP | 0598604 A1 | 5/1994 |
| EP | 0601753 A1 | 6/1994 |
| EP | 0635512 A1 | 1/1995 |
| EP | 0655476 A1 | 5/1995 |
| EP | 0436186 B1 | 10/1995 |
| EP | 0688778 A1 | 12/1995 |
| EP | 0714926 A2 | 6/1996 |
| EP | 0699701 A3 | 9/1996 |
| EP | 0 776 927 | 6/1997 |
| EP | 0798336 A2 | 10/1997 |
| EP | 1 008 629 | 6/2000 |
| EP | 1 026 203 | 8/2000 |
| EP | 1111012 A9 | 6/2001 |

| | | |
|---|---|---|
| EP | 1 172 409 | 1/2002 |
| EP | 0 594 385 | 5/2003 |
| EP | 1 308 208 | 5/2003 |
| EP | 1 354 908 | 10/2003 |
| EP | 01968581.7-2102 | 11/2003 |
| EP | 1 378 540 | 1/2004 |
| EP | 01942649.3-2102 | 1/2004 |
| EP | 1 420 036 | 5/2004 |
| EP | 02756358.4-2117 | 5/2004 |
| EP | 1 475 402 | 11/2004 |
| EP | 03714278.3-2102 | 11/2004 |
| EP | 01968413.3-2102 | 12/2004 |
| EP | 02734665.9-2102 | 12/2004 |
| EP | 02756358.4-2117 | 4/2005 |
| FR | 2 530 628 | 1/1984 |
| GB | 765 597 | 1/1957 |
| GB | 798412 | 7/1958 |
| GB | 957841 | 5/1964 |
| GB | 991020 | 5/1965 |
| GB | 1044205 | 9/1966 |
| GB | 1108921 | 4/1968 |
| GB | 1273225 | 5/1972 |
| GB | 1349324 | 4/1974 |
| GB | 2 123 405 A | 2/1984 |
| JP | 4621873 | 6/1971 |
| JP | 476425 | 10/1972 |
| JP | 57-122078 A | 7/1982 |
| JP | 6275547 | 4/1987 |
| JP | 62141063 A | 6/1987 |
| JP | 63156824 A | 11/1988 |
| JP | 02 147657 A | 6/1990 |
| JP | 02298512 | 12/1990 |
| JP | 4253764 | 9/1992 |
| JP | 08-093594 | 4/1996 |
| JP | 09048876 | 2/1997 |
| JP | 09-110832 | 4/1997 |
| JP | 09-238806 | 9/1997 |
| JP | 10-069915 | 3/1998 |
| JP | 10-194262 | 7/1998 |
| JP | 11-136942 | 5/1999 |
| JP | 2001031846 | 2/2001 |
| JP | 2002293902 | 10/2002 |
| JP | 2002293903 | 10/2002 |
| JP | 2002308969 | 10/2002 |
| JP | 2002317041 | 10/2002 |
| JP | 02320499 | 11/2002 |
| JP | 02322272 | 11/2002 |
| JP | 02338672 | 11/2002 |
| JP | 2003 082 081 | 3/2003 |
| SU | 1077893 | 3/1984 |
| SU | 1532560 A1 | 12/1989 |
| WO | 88/06605 | 9/1988 |
| WO | 91/09899 | 7/1991 |
| WO | 93/04106 | 3/1993 |
| WO | 95/00574 | 1/1995 |
| WO | 95/30702 | 11/1995 |
| WO | 96/22319 | 7/1996 |
| WO | 99/25485 | 5/1999 |
| WO | 00/27632 | 5/2000 |
| WO | 00/38897 | 7/2000 |
| WO | 2001/053379 | 7/2001 |
| WO | 01/56694 A1 | 8/2001 |
| WO | 2002/018476 | 3/2002 |
| WO | 2002/022738 | 3/2002 |
| WO | 02/051616 A | 7/2002 |
| WO | 2002/098946 | 12/2002 |
| WO | 2002/098947 | 12/2002 |
| WO | 2003/002551 | 1/2003 |
| WO | 03/031496 A1 | 4/2003 |
| WO | 2003/031059 | 4/2003 |
| WO | 2003/080705 | 10/2003 |
| WO | 2004/058471 | 7/2004 |
| WO | 2004/058854 | 7/2004 |
| WO | 2004/058868 | 7/2004 |
| WO | 2004/058872 | 7/2004 |
| WO | 2004/060640 | 7/2004 |
| WO | 2005/063882 | 7/2005 |
| WO | 2005/090508 | 9/2005 |
| WO | 2005/105889 | 11/2005 |
| WO | 2005/121233 | 12/2005 |
| WO | 2006/009735 | 1/2006 |
| WO | 2006/009803 | 1/2006 |
| WO | 2006/009804 | 1/2006 |
| WO | 2006/028541 | 3/2006 |

OTHER PUBLICATIONS

Bagshaw et al., "Templating of Mesoporous Molecular Sieves by Nonionic Polyethylene Oxide Surfactants," *Science*, 269, p. 1242, Sep. 1, 1995.

Beach, A. Christopher G. "The Preparation of Mirrors by Sputtering Metals onto Glass Surfaces," *A. Inst. P.*, Chelsea Polytechnic, M.S. received, Mar. 17, 1930.

Brunelle (1995) "Macrocycles For The Synthesis of High Molecular Weight Polymers" pp. 197-235, ch. 6, New Methods of Polymer Synthesis: vol. 2, edited by J.R. Ebdon and G.C. Eastmond.

Brunelle et al. (1997) "Semi-crystalline Polymers via Ring-Opening Polymerization: Preparation and Polymerization of Alkylene Phthalate Cyclic Oligomers" *Polymers Preprints* vol. 38, No. 2, pp. 381-382.

Brunelle et al. (1998) "Semicrystalline Polymers via Ring-Opening Polymerization: Preparation and Polymerization of Alkylene Phthalate Cyclic Oligomers" *Macromolecules* vol. 31, No. 15, 4782-4790.

Burch, R. R. et al. (2000) "Synthesis of Cyclic Oligoesters and Their Rapid Polymerization to High Molecular Weight" Macromolecules, vol. 33, No. 14, 5053-5064.

Chisholm et al., "Syntheses and structural characterization of 2,2'-methylene-bis(6-$t$-butyl-4-methyl-phenoxide) complexes of titanium, zirconium and tantalum," *Polyhedron*, vol. 16, No. 17, (1997) pp. 2941-2949.

Cotton, N. J. et al. (1993) "Rate and Extent of Supercritical Fluid Extraction of Cyclic Trimer from Poly(Ethylene Terephthalate) at Elevated Temperatures" *Journal of Chromatographic Science*, vol. 31, No. 5, 157-161.

Cussler et al. "Barrier Membranes," *Journal of Membrane Science*, 38 (1988) pp. 161-174.

Durfee et al. "Chemical and Electrochemical Reduction of Titanium (IV) Aryloxides," *Inorganic Chemistry*, 24 (1985) pp. 4569-4573.

Fantacci et al. "Density Functional Study of Tetraphenolate and Calix[4]arene Complexes of Early Transition Metals," *Inorganic Chemistry*, 40 (2001) pp. 1544-1549.

Fukushima et al. "Graphite Nanoplatelets as Reinforcements for Polymers: Structural, Electrical and Thermal Properties," *Proc. 2nd Ann., Automotive Comp. Conf., Soc. Plast. Eng.*, Sep. 2002, 7 pgs.

Fukushima et al. "Synthesis of an Intercalated Compound of Montmorillonite and 6-Polyamide," *Journal of Inclusion Phenomena*, 5 (1987) pp. 473-482.

Hall et al. "Recent research on the synthesis and applications of cyclic oligomers," *Reactive & Functional Polymers*, 41 (1999), pp. 133-139.

Hamb et al. Synthesis of Cyclic Tris(Ethylene Terephthalate), *Polymer Letters*, 5 (1967), pp. 1057-1058.

Hamilton et al. (1998) "Cyclic Polyesters: Part 8. Preparation and Characterization of Cyclic Oligomers in Six Aromatic Ester and Ether-Ester Systems" *Polymer* vol. 39, No. 14., 3241-3252.

Harrison, A. G. et al. (1997) "Analysis of cyclic oligomers of poly(ethylene terephthalate) by liquid chromatography/mass spectrometry" Polymer Communications, vol. 38, No. 10, 2549-2555.

Henshaw et al. (1994) "Recycling of a Cyclic Thermoplastic Composite Material by Injection and Compression Molding" *J. of Thermoplastic Composite Materials* vol. 7 (1), 14-29.

Hubbard, P. A. (1996) "Polyesters via Macrocyclic Oligomers" Dissertation presented at the University of Akron.

Kaviratna et al., "Synthesis of Polyether-Clay Nanocomposites: Kinetics of Epoxide Self-Polymerization in Acidic Smectite Clays," Polym. Prep., 31(1), 788 (1994).

Kojima et al., "Mechanical properties of nylon 6-clay hybrid," J. Mater. Res., 8, 1185 (1993).

Kricheldorf, H. R. et al. (1997) "Macrocycles IV. Macrocyclic Polylactones as Bifunctional Monomers for Polycondensations" *Journal of Polymer Science*, vol. 36, No. 9, 1373-1378.

Kricheldorf, H. R. et al. (1998) "Macrocycles. 3. Telechelic Polylactones via Macrocyclic Polymerization" Macromolecules, vol. 31, No. 3, 614-620.

Lattimer et al. (1998) "MALDI-MS Analysis of Pyrolysis Products From a Segmented Polyurethane" *Journal of Analytical and Applied Pyrolysis*, vol. 48, 1-15.

Lee, J. et al., "Fire Retardent Polyetherimide Nanocomposites," Matter Res. Soc. Proc., 457, 513-518, (1997).

Lee, S.-S. et al., "Synthesis of PET-Layered Silicate Nanocomposites Using Cyclic Ester Oligomers," Polymeric Materials: Science and Engineering, 89, 370-1 (2003).

Lui et al. (1999) "Preparation of Cyclic Polyester Oligomers and Ultra-Low VOC Polyester Coatings" *Polymer Reprints*, vol. 40, No. 1, pp. 137-138.

Martin et al. (1987) "Pultrusion", *Engineered Materials Handbook*: vol. 1 Composites, pp. 533-543.

Messersmith et al., "Polymer-Layered Silicate Nanocomposites: In Situ Intercalative Polymerization of $\epsilon$-Caprolactone in Layered Silicates," Chem. Mater., 5, 1064 (1993).

Miller, S. (1998) "Macrocyclic polymers from cyclic oligomers of poly(butylene terephthalate)" Dissertation Presented at University of Massachusetts, Amherst, MA US.

Mueller, F. J. et al. (1983) "Synthesis of Cyclic Oligomers of Butylene Terephthalate" *Makromol. Chem.*, vol. 184, No. 12, 2487-95.

Mueller, F. J. et al. (1983) "Synthesis of Cyclic Oligomers of Butylene Terephthalate" *Makromol. Chem.*, vol. 184, No. 12, 2487-95. (Translation).

Nazar, et al., "Synthesis and Properties of a New (PEO)x[Na(H2O)]0.25 MoO3 Nanocomposites," J. Mater. Res., 5(11), 1985 (1995).

Okada, et al., "Synthesis and Characterization of a Nylon 6-Clay Hybrid," Polym. Prep., 28, 447, (1987).

Okuda et al. "Synthesis and Characterization of Mononuclear Titanium Complexes Containing a Bis(phenoxy) Ligand Derived from 2,2'-Methylene-bis(6-*tert*-butyl-4-methylphenol)," *Chem. Ber.*, vol. 128, (1995) pp. 221-227.

Oriakhi et al., "Poly(Pyrrole) and Poly(Thiophene) / Clay Nanocomposites Via Latex-Colloid Interaction," Mater. Res. Bull., 30, No. 6, p. 723, (1995).

Perovic et al. (1982) "Crystallization of Cyclic Oligomers in Commercial Poly(ethleneterephthalate) Films" *Polymer Bulletin* vol. 6, 277-283.

Perovic, A. (1985) "Morphological Instability of poly(ethylene terephthalate) cyclic oligomer crystals" *Journal of Material Science*, vol. 20, Iss. 4, 1370-1374.

Roelens, S. (1988) "Organotin-Mediated Synthesis of Macrocyclic Polyesters: Mechanism and Selectivity in the Reaction of Dioxastannolanes with Diacyl Dichlorides" *Journal of the Chemical Society, Perkin Transactions 2*, vol. 8, 1617-1625.

Ruddick et al. "A new method for the polymer-supported synthesis of cyclic oligoesters for potential applications in macrocyclic lactone synthesis and combinatorial chemistry," *J. Chem. Soc., Perkin Trans. 1*, 2002, pp. 627-637.

Scatteia et al., "Rheology of PBT-Layered Silicate Nanocomposites Prepared by Melt Compounding," Plastics, Rubbers and Composites, 33, 85-91 (2004) and references therein.

Spanagel et al. "Macrocyclic Esters," Contribution No. 153 from The Experimental Station of E.I. duPont deNemours & Company, vol. 57, pp. 929-934.

Toth et al. "Towards supported catalyst models: the synthesis, characterization, redox chemistry, and structures of the complexes Ti(Oar')$_4$ (Ar'=C$_6$H$_4$(2-*t*-Bu), C$_6$H(2,3,5,6-Me)$_4$)," *Canadian Journal of Chemistry*, vol. 69, (1991) pp. 172-178.

Tripathy, et al., "Poly(Butylene Terephthalate) Nanocomposites Prepared by In-Situ Polymerization," Macromolecules, 36, 8593-5 (2003).

Uhl et al. "Flame Retarduncy of Graphite Nanocomposites," *Polym. Mater. Sci. Eng.* 83:56(2000).

Usuki et al. "Swelling behavior of montmorillonite cation exchanged for ω-amino acids by $\epsilon$-caprolactam," *J. Mater. Res.*, vol. 8, No. 5, May 1993, pp. 1174-1178.

Usuki et al. "Synthesis of nylon 6-clay hybrid," J. Mater. Res., vol. 8, No. 5, May 1993, pp. 1179-1184.

Vankelecom et al. "Incorporation of Zeolites in polyimide Membranes," J. Phys. Chem., 99, 13187 (1995).

Ward et al. "Gas barrier improvement using vermiculite and mica in polymer films," *Journal of Membrane Science*, 55 (1991) pp. 173-180.

Xiao et al. "Preparation of exfoliated graphite/polystyrene composite by polymerization-filling technique," *Polymer*, 42 (2001) pp. 4813-4816.

Yano, K. et al., "Synthesis and Properties of Polyimide-Clay Hybrid," J. Polym. Sci., Part A, Polym. Chem., 31, 2493 (1993).

Youk et al. "Polymerization of Ethylene Terephthalate Cyclic Oligomers with Antimony Trioxide," *Macromolecules*, 33 (2000), pp. 3594-3599.

Written Opinion of related International Application No. PCT/US2004/042666, dated May 23, 2005.

Kizilcan et al., "Block Copolymers of Styrene Containing Oligomeric Ester of Terephthalic Acids," *Journal of Applied Polymer Science*, vol. 76, pp. 648-653 (2000).

Database WPI Section Ch, Week 199029, Derwent Publications Ltd., London, GB; Class A23, AN 1990-219860, XP002343080, Jun. 6, 1990.

Database WPI Section Ch, Week 199114, Derwent Publications Ltd., London, GB; Class A23, AN 1991-097785, XP002390855, Feb. 21, 1991.

Database WPI Section Ch, Week 199954, Derwent Publications Ltd., London, GB; Class A23, AN 1999-622614, XP002390856, May 18, 1999.

Jiminez, G., et al., "Structure and thermal/mechanical properties of poly(e-caprolactone)-clay blend," *Journal of Applied Polymer Science* (XP000916366 ISSN: 0021-8995), John Wiley and Sons, Inc., NY, vol. 64, No. 11, 1997, pp. 2211-2220.

Krikorian, V., et al., "Unusual crystallization behavior of organoclay reinforced poly (l-lactic acid) nanocomposites," *Macromolecules* (XP001200895 ISSN: 0024-9297), ACS, Washington, D.C., vol. 37, No. 17, Aug. 24, 2004, pp. 6480-6491.

Messersmith et al., "Synthesis and barrier properties of poly(e-caprolactone-layered silicate nanocomposites," *Journal of Polymer Science: Part A: Polymer Chemistry* (XP002343042) vol. 33, 1995, pp. 1047-1057.

PCT International Search Report and Written Opinion of the International Searching Authority, International application No. PCT/US2005/019494, issued Sep. 13, 2005.

PCT International Search Report and Written Opinion of the International Searching Authority, International application No. PCT/US2006/007672, issued Jul. 27, 2006.

PCT International Search Report and Written Opinion of the International Searching Authority, International application No. PCT/US2006/010541, issued Sep. 1, 2006.

"Rompp-Chemielexikon," 1992, Thieme 6, XP002343043.

U.S. Appl. No. 09/974,722, filed Oct. 9, 2001, Phelps et al.
U.S. Appl. No. 09/945,233, filed Aug. 31, 2001, Faler.
U.S. Appl. No. 09/906,385, filed Jul. 16, 2001, Wang.
U.S. Appl. No. 09/874,706, filed Jun. 5, 2001, Wang.
U.S. Appl. No. 09/754,943, filed Jan. 4, 2001, Winckler et al.
U.S. Appl. No. 09/659,975, filed Sep. 12, 2000, Phelps.
U.S. Appl. No. 10/102,162, filed Mar. 20, 2002, Wang et al.
U.S. Appl. No. 10/040,530, filed Jan. 7, 2002, Wang.

INTIMATE PHYSICAL MIXTURES CONTAINING MACROCYCLIC POLYESTER OLIGOMER AND FILLER

PRIOR APPLICATIONS

This application is a continuation of U.S. patent application Ser. No. 10/859,784, filed on Jun. 3, 2004, and issued as U.S. Pat. No. 6,960,626, which is a continuation-in-part of U.S. patent application Ser. No. 10/408,753, filed on Apr. 7, 2003, and issued as U.S. Pat. No. 6,994,914, which is a continuation of U.S. patent application Ser. No. 10/195,853, filed on Jul. 15, 2002, and issued as U.S. Pat. No. 6,639,009, which is a continuation of U.S. patent application Ser. No. 09/754,943, filed on Jan. 4, 2001, and issued as U.S. Pat. No. 6,420,047, which is a continuation-in-part of U.S. patent application Ser. No. 09/535,132, filed on Mar. 24, 2000, and issued as U.S. Pat. No. 6,369,157, which claims benefit of U.S. Provisional Patent Application No. 60/177,727, filed on Jan. 21, 2000, the descriptions of which are incorporated herein by reference in their entirety. U.S. patent application Ser. No. 10/859,784 is related to the commonly-owned U.S. patent application Ser. No. 11/860,431, filed on Jun. 3, 2004, the description of which is hereby incorporated by reference in its entirety. U.S. patent application Ser. No. 10/859,784 further claims benefit of and priority to commonly-owned U.S. Provisional Patent Application No. 60/530,942, filed on Dec. 19, 2003.

FIELD OF THE INVENTION

This invention relates generally to thermoplastics and articles formed therefrom. More particularly, in certain embodiments, the invention relates to intimate physical mixtures of macrocyclic polyester oligomer and filler.

BACKGROUND OF THE INVENTION

Semi-crystalline polymers are useful as engineering thermoplastics because they possess advantageous chemical, physical, and electrical properties, and because they can be readily processed by thermal means. For example, linear semi-crystalline polymers such as polyethylene terephthalate (PET) and polybutylene terephthalate (PBT) are processed by injection molding and extrusion in the manufacture of plastic components.

It is important that semi-crystalline polymers be heat resistant, because they are typically processed at high temperature. Heat deflection temperature (HDT) is a measure of the short-term heat resistance of a material. The heat deflection temperature distinguishes between materials that are able to sustain light loads at high temperatures and those that lose their rigidity over a narrow temperature range. Thus, a high heat deflection temperature is indicative of a material whose modulus (i.e. Young's modulus) is high over a wide temperature range.

It is of interest, therefore, to increase the heat deflection temperature of polymeric materials without substantially affecting other desired properties of the material. Similarly, it is desired to increase the modulus of a material over a wide temperature range without substantially affecting other desired properties of the material.

Certain fillers have been added to polymer compositions in an attempt to increase heat deflection temperature. Fillers that have been added to polymer compositions include fibrous fillers with high modulus, such as fiberglass and carbon fiber, as well as non-fibrous fillers such as calcium carbonate, wollastonite, and mica. However, the addition of filler to a polymer will generally have a negative impact on other properties of the resulting polymer composition, such as ductility, impact strength, and toughness. Furthermore, it is a general rule that the more filler that is added, the greater its impact on the properties of the polymer composition.

Fillers with high aspect ratio have been investigated, because lesser amounts of these fillers are generally needed to produce a desired modulus-increasing effect for a given polymer composition. However, there are a number of problems resulting from the use of high-aspect-ratio fillers. It is typically more difficult to incorporate fillers with high aspect ratio into polymer. Often, the filler is not compatible with the polymer, and stable, highly-disperse mixtures of the filler in the polymer are difficult or impossible to achieve.

Macrocyclic polyester oligomer (macrocyclic oligoester, MPO) has unique properties that make it attractive as a matrix-forming resin for engineering thermoplastic composites. For example, MPO generally exhibits low melt viscosity and can polymerize at temperatures well below the melting point of the resulting polymer. An MPO of particular interest is macrocyclic poly(1,4-butylene terephthalate) oligomer.

It has been shown that mixtures of macrocyclic poly(1,4-butylene terephthalate) oligomer and organically-modified montmorillonite (a form of aluminosilicate) can be polymerized to produce a polymeric composition with high modulus (see, e.g. U.S. Pat. No. 5,707,439, by Takekoshi et al.). However, montmorillonite must be modified by cation exchange prior to incorporation with the MPO.

SUMMARY OF THE INVENTION

It has been discovered that anhydrous magnesium silicate (talc) is highly compatible with certain macrocyclic polyester oligomers (MPO), and may be homogeneously dispersed into MPO without undergoing modification by ion exchange or other surface treatment.

Accordingly, the invention provides intimate physical mixtures of macrocyclic polyester oligomer (MPO) with unmodified, high-aspect-ratio filler, as well as methods for preparing and using such mixtures. In particular, the invention provides mixtures of MPO with anhydrous magnesium silicate (anhydrous talc), which can be polymerized to form polymer compositions having advantageous properties.

Because of the unexpectedly high compatibility of anhydrous magnesium silicate filler with MPO, improved dispersion of the filler in a polymer matrix can be achieved upon polymerization of the MPO in the MPO-filler mixture; and because of the low viscosity associated with MPO, larger amounts of high-aspect-ratio filler can be used therein. Polymer compositions made from MPO-filler mixtures exhibit significantly higher elastic modulus than unfilled, polymerized MPO over a broad temperature range, indicating improved heat resistance, processibility, stiffness, and strength in a wide variety of processing environments. Furthermore, the presence of the filler in the MPO composite does not significantly affect the polymerization rate of the MPO, nor is percent conversion or average molecular weight of the resulting polymer significantly affected.

Thus, in one aspect, the invention provides a mixture including an MPO and a filler, where the filler comprises a magnesium silicate. The magnesium silicate is preferably anhydrous. The mixture may be an intimate physical mixture or a nanocomposite, for example. In a preferred embodiment, the filler dissolves in the mixture. The filler may be present in the mixture in any amount, for example, in an amount of at least about 10 wt. %, at least about 20 wt. %, at least about 30 wt. %, or at least about 40 wt. %, greater than about 40 wt. %, greater than about 50 wt. %, greater than about 60 wt. %, greater than about 70 wt. %, or more.

In one embodiment, the polymer produced from the MPO-filler mixture exhibits a higher elastic modulus than the polymer produced from the unfilled MPO over a wide temperature range—for example, at least over a temperature range from about 25° C. to about 50° C., from about 25° C. to about 100° C., from about 25° C. to about 150° C., from about 25° C. to about 200° C., from about 10° C. to about 50° C., from about 10° C. to about 100° C., from about 10° C. to about 150° C., or from about 10° C. to about 200° C.

The MPO in the mixture may include one or more species. The species may have different degrees of polymerization. In one embodiment, the MPO includes butylene terephthalate units and oxydiethylene terephthalate units.

In one embodiment, the mixture further includes an MPO polymerization catalyst—for example, a tin compound, such as butyltin chloride dihydroxide, or a titanate compound. Mixtures of the invention (both with and without catalyst) are preferably stable under ambient conditions (at room temperature in air) for at least a week, and may be stable at least a month, at least a year, or even longer under ambient conditions. In one embodiment, the invention provides a polymer composition resulting from polymerization of one or more components of a mixture of the invention. In one embodiment, the invention provides an article of manufacture produced by polymerizing a mixture of the invention.

In another aspect, the invention provides a method for preparing an intimate physical mixture of MPO and anhydrous magnesium silicate, the method comprising the step of contacting the MPO and anhydrous magnesium silicate at a temperature at which the MPO is at least partially melted. In one embodiment, the temperature is within a range from about 150° C. to about 190° C. The MPO may be contacted with the talc before, during, or after the MPO melts. Preferably, the anhydrous magnesium silicate dissolves in the mixture.

The mixture may be polymerized, for example, in a two-part system, where the polymer-filler mixture is exposed to a temperature sufficient to melt the MPO, and the resulting mixture is contacted with a polymerization catalyst whereupon polymerization and crystallization occur substantially isothermally, thereby forming a polymeric composition comprising polymer and filler. The polymerization may take place in any molding, casting, or forming process, for example, an injection molding process, a rotational molding process, a resin film infusion process, a solvent prepreg process, a hot melt prepreg process, an extrusion process, a pultrusion process, a resin transfer molding process, a filament winding process, a compression molding process, a roll wrapping process, a powder coating process, and combinations thereof. The time and expense required to thermally cycle a tool is favorably reduced, for example, because demolding can take place immediately following polymerization, without first cooling the mold.

Alternatively, the MPO-filler mixture may be stored as a one-part, ready-to-polymerize blend comprising MPO, filler, and a polymerization catalyst. The one-part blend remains stable for at least a week, for at least a month, or for at least a year or more, without significant premature polymerization of MPO and without significant deactivation of catalyst. When it is desired to polymerize the MPO, the one-part blend is exposed to a temperature sufficient to melt and polymerize the MPO, whereupon polymerization and crystallization occur substantially isothermally.

In yet another aspect, the invention provides a method for polymerizing an MPO, the method comprising the steps of providing a mixture comprising MPO, a polymerization catalyst, and a layered mineral, and heating the mixture to polymerize at least one component of the mixture. The layered mineral preferably comprises a silicate, and more preferably comprises magnesium silicate. In one embodiment, the layered mineral is present in the mixture in an amount of at least about 10 wt. %, at least about 20 wt. %, at least about 30 wt. %, at least about 40 wt. %, greater than about 40 wt. %, greater than about 50 wt. %, greater than about 60 wt. %, or greater than about 70 wt. %, although amounts less than 10 wt. %, and amounts greater than 70 wt. % may be used as well.

It is believed that the compatibility of anhydrous magnesium silicate with MPO may be related to the surface energy, charge neutrality, and/or the non-polarity of platelets of anhydrous magnesium silicate. The polar —OH groups of anhydrous talc reside in the interior of the structure of a talc layer and, therefore, are not chemically accessible to the molecules at or near the surface of the talc layer. Other factors that may be related to the compatibility of the filler with MPO include the platyness, softness, hydrophobicity, organophilicity, inertness, and mineralogical composition of the filler.

Thus, in still another aspect, the invention is directed to an intimate physical mixture comprising an MPO and a layered mineral, where the layered mineral has a non-polar, charge-neutral surface. In one embodiment, the layered mineral comprises at least one of molybdenum sulfide, graphite, magnesium, iron, calcium, potassium, sodium, manganese, titanium, zirconium, copper, berylium, and zinc. The intimate physical mixture may also contain a catalyst, and may be stable at ambient conditions for at least one week, at least one month, or longer.

BRIEF DESCRIPTION OF THE DRAWINGS

The objects and features of the invention can be better understood with reference to the drawings described below, and the claims.

DETAILED DESCRIPTION

Figure 1:
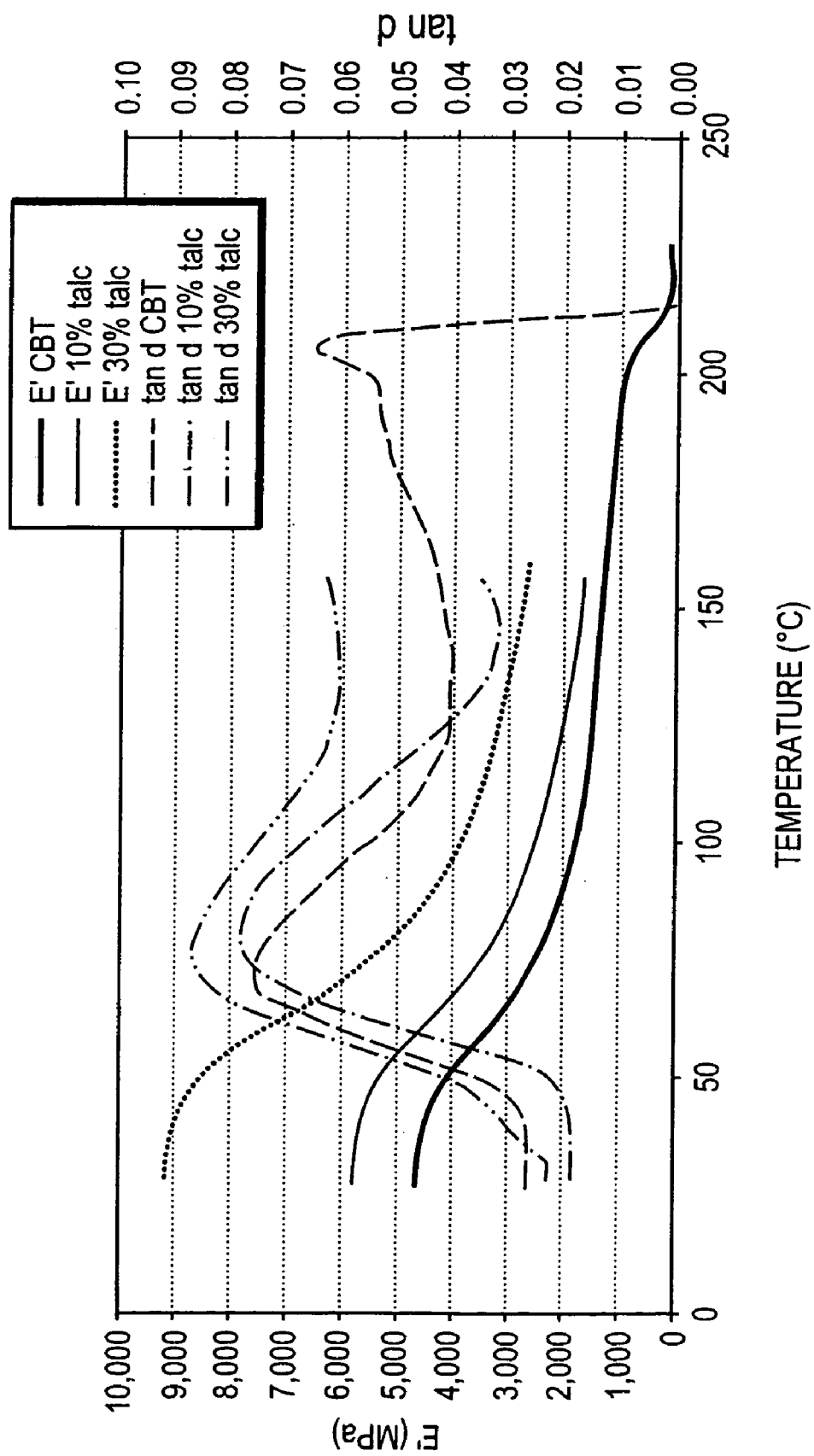
FIG. 1 shows a graph depicting results of dynamic mechanical thermal analysis (DMTA) tests of illustrative polymer compositions of the invention containing 0 wt. %, 10 wt. %, and 30 wt. % anhydrous magnesium silicate.

It has been discovered that substantially pure, anhydrous magnesium silicate dissolves in molten macrocyclic poly(1, 4-butylene terephthalate) oligomer at a temperature within a range from about 150° C. to about 190° C., resulting in a homogeneous, transparent liquid. The discovery is unexpected, because attempts to incorporate aluminosilicate fillers into polymers have required that the aluminosilicate platelet surface be modified in order to compatibilize the filler with the polymer matrix. Unlike montmorillonite, for example, the magnesium silicate of the present invention does not require modification by cation exchange prior to incorporation with MPO.

Upon cooling to ambient temperature, a solution of macrocyclic poly(1,4-butylene terephthalate) oligomer and magnesium silicate hardens into a transparent solid, indicating the silicate is dispersed in the mixture well enough to allow light to penetrate the mixture. That is, an average-sized filler particle in the resulting intimate physical mixture has at least one dimension (i.e. length, width, and/or height) that is less than roughly 400 nm (0.4 micron), the shortest wavelength of visible light. In one embodiment, a near-molecular blend of MPO and filler is achieved, and the intimate physical mixture is a nanocomposite. In the context of plastics, a nanocomposite is a near-molecular blend of (1) polymer molecules and (2) nano-scale particles, where a nanoscale particle is a material with at least one dimension in the nanometer range.

The intimate physical mixture is stable, and the filler remains dispersed in the mixture for at least a week, for at least a month, or for at least a year or more under ambient conditions. A long shelf life enhances the versatility of the mixture. For example, the mixture may be stored for a long period of time, without requiring refrigeration or storage in an oxygen-free environment, before the mixture is polymerized in the manufacture of a plastic component.

It has been further discovered that polymer compositions formed from intimate physical mixtures of magnesium silicate and MPO exhibit increased Young's modulus (E') over a wide range of temperature, for example, from about 25° C. to about 160° C., as well as higher heat deflection temperatures (HDT), indicating an improved heat resistance of the filler-containing polymer composition compared with the unfilled polymer. In certain embodiments, the invention provides methods of filling polymer so as to increasing its HDT value by 10%, 20%, 30%, 40%, 50%, 75%, 100%, or more.

Furthermore, it is possible to incorporate large amounts of high-aspect-ratio filler in the mixture, for example, because: (1) the filler and MPO are highly compatible (depending on the filler used, the filler may actually dissolve in the MPO), (2) the filler can be melt-mixed with MPO at a relatively low temperature, and (3) the MPO has a very low melt viscosity. Since MPO melts at relatively low temperatures, it is possible to avoid or limit the exposure of the mixture components to high temperature during incorporation of filler and/or catalyst. Surprisingly, the presence of the filler in the blend: (1) does not substantially decrease the rate of polymerization of the MPO contained in the blend, (2) does not substantially reduce the ultimate conversion of MPO to polymer, and (3) does not affect the ability of the blend to polymerize and crystallize essentially isothermally at polymerization temperatures.

In addition to mixtures of MPO with talc and/or other layered minerals, the invention also provides mixtures of MPO with certain other fillers, such as milled glass fiber, in which the presence of the filler increases HDT and increases the elastic modulus of the mixture over a wide temperature range. These fillers may be used alone, or in combination, at levels of up to about 30 wt. %, greater than about 30 wt. %, greater than about 40 wt. %, greater than about 50 wt. %, greater than about 60 wt. %, greater than about 70 wt. %, greater than about 80 wt. %, greater than about 90 wt. %, or even more, where weight percent is based on the total weight of the MPO-filler mixture.

Throughout the description, where compositions, mixtures, blends, and composites are described as having, including, or comprising specific components, or where processes and methods are described as having, including, or comprising specific steps, it is contemplated that, additionally, there are compositions, mixtures, blends, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

The following general definitions may be helpful in understanding the various terms and expressions used in this specification.

Definition

As used herein, "macrocyclic" is understood to mean a cyclic molecule having at least one ring within its molecular structure that contains 5 or more atoms covalently connected to form the ring.

As used herein, an "oligomer" is understood to mean a molecule that contains one or more identifiable structural repeat units of the same or different formula.

As used herein, a "macrocyclic polyester oligomer" is understood to mean a macrocyclic oligomer containing structural repeat units having an ester functionality. A macrocyclic polyester oligomer typically refers to multiple molecules of one specific repeat unit formula. However, a macrocyclic polyester oligomer also may include multiple molecules of different or mixed formulae having varying numbers of the same or different structural repeat units. In addition, a macrocyclic polyester oligomer may be a co-polyester or multi-component polyester oligomer, i.e., an oligomer having two or more different structural repeat units having ester functionality within one cyclic molecule.

As used herein, "substantially homo- or co-polyester oligomer" is understood to mean a polyester oligomer wherein the structural repeat units are substantially identical or substantially composed of two or more different structural repeat units, respectively.

As used herein, an "alkylene group" is understood to mean $-C_nH_{2n}-$, where $n \geq 2$.

As used herein, a "cycloalkylene group" is understood to mean a cyclic alkylene group, $-C_nH_{2n-x}-$, where x represents the number of H's replaced by cyclization(s).

As used herein, a "mono- or polyoxyalkylene group" is understood to mean $[-(CH_2)_m-O-]_n-(CH_2)_m-$, wherein m is an integer greater than 1 and n is an integer greater than 0.

As used herein, a "divalent aromatic group" is understood to mean an aromatic group with links to other parts of the macrocyclic molecule. For example, a divalent aromatic group may include a meta- or para-linked monocyclic aromatic group (e.g., benzene).

As used herein, an "alicyclic group" is understood to mean a non-aromatic hydrocarbon group containing a cyclic structure within.

As used herein, a "$C_{1-4}$ primary alkyl group" is understood to mean an alkyl group having 1 to 4 carbon atoms connected via a primary carbon atom.

As used herein, a "$C_{1-10}$ alkyl group" is understood to mean an alkyl group having 1 to 10 carbon atoms, including straight chain or branched radicals.

As used herein, a "methylene group" is understood to mean $-CH_2-$.

As used herein, an "ethylene group" is understood to mean $-CH_2-CH_2-$.

As used herein, a "$C_{2-3}$ alkylene group" is understood to mean $-C_nH_{2n}-$, where n is 2 or 3.

As used herein, a "$C_{2-6}$ alkylene group" is understood to mean —$C_nH_{2n}$—, where n is 2-6.

As used herein, "substitute phenyl group" is understood to mean a phenyl group having one or more substituents. A substituted phenyl group may have substitution pattern that is recognized in the art. For example, a single substituent may be in the ortho, meta or para positions. For multiple substituents, typical substitution patterns include, for example, 2,6-, 2,4,6-, and, 3,5-substitution patterns.

As used herein, a "filler" is understood to mean a material other than a macrocyclic polyester oligomer or a polymerization catalyst that may be included in the blend material. A filler may be used to achieve a desired purpose or property, and may be present or transformed into known and/or unknown substances in the resulting polyester polymer. For example, the purpose of the filler may be to provide stability, such as chemical, thermal, or light stability, to the blend material or the polyester polymer product (i.e. to increase E' over a wide temperature range and/or to increase HDT), and/or to increase the strength of the polyester polymer product. A filler also may provide or reduce color, provide weight or bulk to achieve a particular density, provide reduced gas and vapor permeability, provide flame or smoking resistance (i.e., be a flame retardant), be a substitute for a more expensive material, facilitate processing, and/or provide other desirable properties. Illustrative examples of fillers are, among others, anhydrous magnesium silicate (anhydrous talc), fumed silica, titanium dioxide, calcium carbonate, wollastonite, chopped fibers, fly ash, glass, glass fiber, milled glass fiber, glass microspheres, micro-balloons, crushed stone, nanoclay, linear polymers, and monomers.

As used herein, a "polymer composition" is understood to mean a polymeric material comprising filler.

The following headers are provided as a general organizational guide and do not serve to limit support for any given element of the invention to a particular section of the Description.

I. Macrocyclic Polyester Oligomer

One of the ingredients of the mixtures of the invention is a macrocyclic polyester oligomer. Many different macrocyclic polyester oligomers can readily be made and are useful in the practice of this invention. Thus, depending on the desired properties of the final polymer composition, the appropriate macrocyclic polyester oligomer(s) can be selected for use in its manufacture.

Macrocyclic polyester oligomers that may be employed in this invention include, but are not limited to, macrocyclic poly(alkylene dicarboxylate) oligomers having a structural repeat unit of the formula:

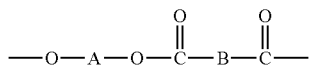

where A is an alkylene, or a cycloalkylene or a mono—or polyoxyalkylene group; and B is a divalent aromatic or alicyclic group.

Preferred macrocyclic polyester oligomers include macrocyclic poly(1,4-butylene terephthalate) (PBT), poly(1,3-propylene terephthalate) (PPT), poly(1,4-cyclohexylene-dimethylene terephthalate) (PCT), poly(ethylene terephthalate) (PET), and poly(1,2-ethylene 2,6-naphthalenedicarboxylate) (PEN) oligomers, and copolyester oligomers comprising two or more of the above monomer repeat units.

Macrocyclic polyester oligomers may be prepared by known methods. Synthesis of the preferred macrocyclic polyester oligomers may include the step of contacting at least one diol of the formula HO-A-OH with at least one diacid chloride of the formula:

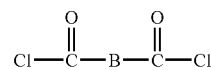

where A and B are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is between about −25° C. and about 25° C. See, e.g., U.S. Pat. No. 5,039,783 to Brunelle et al.

Macrocyclic polyester oligomers have also been prepared via the condensation of a diacid chloride with at least one bis(hydroxyalkyl) ester such as bis(4-hydroxybutyl) terephthalate in the presence of a highly unhindered amine or a mixture thereof with at least one other tertiary amine such as triethylamine, in a substantially inert organic solvent such as methylene chloride, chlorobenzene, or a mixture thereof. See, e.g., U.S. Pat. No. 5,231,161 to Brunelle et al.

Another method for preparing macrocyclic polyester oligomers or macrocyclic copolyester oligomers is to depolymerize linear polyester polymers in the presence of an organotin or titanate compound. In this method, linear polyesters are converted to macrocyclic polyester oligomers by heating a mixture of linear polyesters, an organic solvent, and a trans-esterification catalyst such as a tin or titanium compound. The solvents used, such as o-xylene and o-dichlorobenzene, usually are substantially free of oxygen and water. See, e.g., U.S. Pat. No. 5,407,984 to Brunelle et al. and U.S. Pat. No. 5,668,186 to Brunelle et al.

Macrocyclic polyester oligomers (macrocyclic oligoesters) have been prepared from intermediate molecular weight polyesters by contacting a dicarboxylic acid or a dicarboxylate in the presence of a catalyst to produce a composition comprising a hydroxyalkyl-terminated polyester oligomer. The hydroxyalkyl-terminated polyester oligomer is heated to produce a composition comprising an intermediate molecular weight polyester which preferably has a molecular weight between about 20,000 Daltons and about 70,000 Daltons. The intermediate molecular weight polyester is heated and a solvent is added prior to or during the heating process to produce a composition comprising an MPO. See, e.g., U.S. Pat. No. 6,525,164, to Faler.

Macrocyclic polyester oligomers (macrocyclic oligoesters) that are substantially free from macrocyclic co-oligoesters have been prepared by depolymerizing polyesters using the organo-titanate catalysts described in co-owned U.S. patent application Ser. No. 09/974,722, by Phelps et al., published as U.S. Patent Application Publication No. US 2003/0114640, the text of which is incorporated by reference herein in its entirety.

It is also within the scope of the invention to employ macrocyclic homo- and co-polyester oligomers to produce homo- and co-polyester polymers, respectively. Therefore, unless otherwise stated, an embodiment of a composition, article, process, or method that refers to a macrocyclic polyester oligomer also includes a co-polyester embodiments.

In one embodiment, macrocyclic ester homo- and co-oligomers used in this invention include oligomers having a general structural repeat unit of the formula:

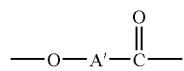

where A' is an alkylene, cycloalkylene, or mono- or poly-oxyalkylene group, and where A' may be substituted, unsubstituted, branched, and/or linear. Example MPO's of this type include butyrolactone and caprolactone, where the degree of polymerization is one, and 2,5-dioxo-1,4-dioxane, and lactide, where degree of polymerization is two. The degree of polymerization may alternatively be 3, 4, 5, or higher. Molecular structures of 2,5-dioxo-1,4-dioxane and lactide, respectively, appear below:

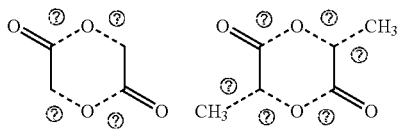

⑦ indicates text missing or illegible when filed

In one embodiment, a macrocyclic polyester oligomer (MPO) used in a mixture of the invention includes species of different degrees of polymerization. Here, a degree of polymerization (DP) with respect to the MPO means the number of identifiable structural repeat units in the oligomeric backbone. The structural repeat units may have the same or different molecular structure. For example, an MPO may include dimer, trimer, tetramer, pentamer, and/or other species.

II. Polymerization Catalyst

Polymerization catalysts employed in the invention are capable of catalyzing the polymerization of the macrocyclic polyester oligomer. As with state-of-the-art processes for polymerizing macrocyclic polyester oligomers, organotin and organotitanate compounds are the preferred catalysts, although other catalysts may be used. For example, organotin compound 1,1,6,6-tetra-n-butyl-1,6-distanna-2,5,7,10-tetraoxacyclodecane may be used as polymerization catalyst. Other illustrative organotin compounds include n-butyltin(IV) chloride dihydroxide, dialkyltin(IV) oxides, such as di-n-butyltin(IV) oxide and di-n-octyltin oxide, and acyclic and cyclic monoalkyltin(IV) derivatives such as n-butyltin tri-n-butoxide, dialkyltin(IV) dialkoxides such as di-n-butyltin(IV) di-n-butoxide and 2,2-di-n-butyl-2-stanna-1,3-dioxacycloheptane, and trialkyltin alkoxides such as tributyltin ethoxide. See, e.g., U.S. Pat. No. 5,348,985 to Pearce et al.

Also, trisstannoxanes having the general formula (I) shown below can be used as a polymerization catalyst to produce branched polyester polymers.

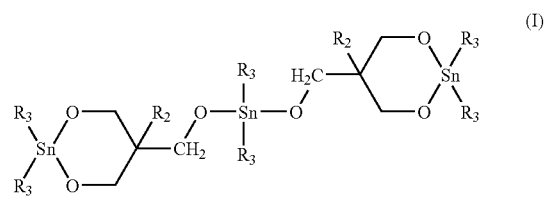

where $R_2$ is a $C_{1-4}$ primary alkyl group and $R_3$ is $C_{1-10}$ alkyl group.

Additionally, organotin compounds with the general formula (II) shown below can be used as a polymerization catalyst to prepare branched polyester polymers from macrocyclic polyester oligomers.

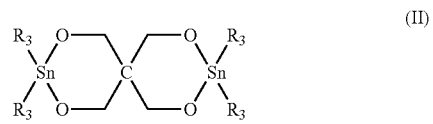

where $R_3$ is defined as above.

As for titanate compounds, tetra(2-ethylhexyl) titanate, tetraisopropyl titanate, tetrabutyl titanate, and titanate compounds with the general formula (III) shown below can be used as polymerization catalysts.

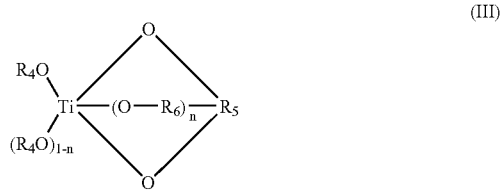

wherein: each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1.

Typical examples of titanate compounds with the above general formula are shown in Table 1.

TABLE 1

Examples of Titanate Compounds Having Formula (III)

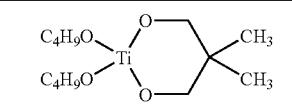

Di-1-butyl 2,2-dimethylpropane-1,3-dioxytitanate

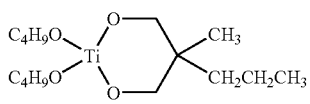

Di-1-butyl 2(1-propyl)-2-methylpropane-1,3-dioxytitanate

TABLE 1-continued

Examples of Titanate Compounds Having Formula (III)

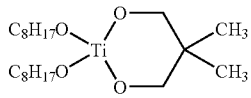

Di(2-ethyl-1-hexyl) 2,2-dimethylpropane-1,3-dioxytitanate

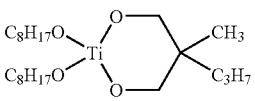

Di(2-ethyl-1-hexyl) 2-(1-propyl)-2-methylpropane-1,3-dioxytitanate

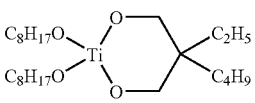

Di(2-ethyl-1-hexyl) 2-(1-butyl)-2-ethylpropane-1,3-dioxytitanate

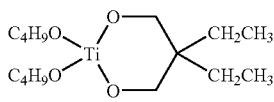

Di-1-butyl 2,2-diethylpropane-1,3-dioxytitanate

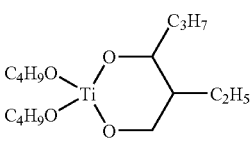

Di-1-butyl 2-ethylhexane-1,3-dioxytitanate

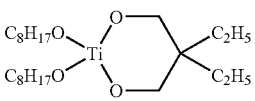

Di(2-ethyl-1-hexyl) 2,2-diethylpropane-1,3-dioxytitanate

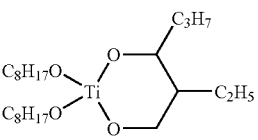

Di(2-ethyl-1-hexyl) 2-ethylhexane-1,3-dioxytitanate

Titanate ester compounds having at least one moiety of the following general formula have also been used as polymerization catalysts:

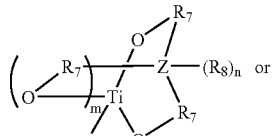

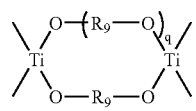

wherein: each $R_7$ is independently a $C_{2-3}$ alkylene group; $R_8$ is a $C_{1-6}$ alkyl group or unsubstituted or substituted phenyl group; Z is O or N; provided when Z is O, m=n=0, and when Z is N, m=0 or 1 and m+n=1; each $R_9$ is independently a $C_{2-6}$ alkylene group; and q is 0 or 1.

Typical examples of such titanate compounds are shown below as formula (VI) and formula (VII):

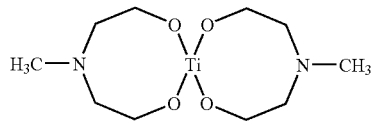

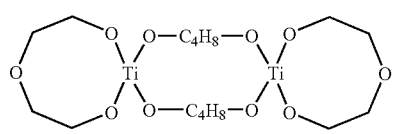

Other polymerization catalysts which may be used in the blend materials of the invention include aryl titanates, described, for example, in co-owned U.S. patent application Ser. No. 10/102,162, published as U.S. Patent Application Publication No. US 2003/0195328, the text of which is incorporated by reference herein in its entirety. Also, polymer-containing organo-metal catalysts may be used in the invention. These include the polymer-containing catalysts described in co-owned U.S. patent application Ser. No. 10/040,530, published as U.S. Patent Application Publication No. US 2003/0162654, the text of which is incorporated by reference herein in its entirety.

III. Preparation of Mixtures Including MPO and Filler

Talc, milled glass fiber, and/or other fillers may be blended with a macrocyclic polyester oligomer (MPO), for example, via melt-mixing, powder mixing, or extrusion. Preferably, the filler is added to MPO before polymerization of the MPO, as this is found to enhance the ultimate dispersion of certain fillers, including anhydrous talc and milled glass fiber, in the polymerized product. In an alternative embodiment, the MPO is partially polymerized at the time of introduction of the filler.

The filler is preferably added to MPO by contacting the filler with molten MPO. Contact of the filler with MPO should take place at a temperature in which all, substantially all, or a significant proportion (for example, more than about 30 wt. %, more than about 60 wt. %, or, preferably, more than about 90 wt. %) of the MPO is melted. In an embodiment where the MPO comprises macrocyclic poly(butylene terephthalate) oligomer in a substantial proportion, filler is preferably added to the MPO when the MPO is at a temperature from about 150° C. to about 190° C., for example. Contact of the filler with MPO is preferably combined with mixing, extrusion, or any other process that enhances the dispersion of filler into MPO. The process may be a batch process, or it may be continuous or semi-continuous. In one embodiment, "melt-mixing" occurs as a mixture of MPO and filler is extruded, and the extrudate is quenched.

An appropriate catalyst—for example, a zinc-, titanium-, or tin-containing polymerization catalyst such as those described herein above—may be added before, during, or after the filler is contacted (and preferably mixed) with the macrocyclic oligoester to produce a one-part, ready-to-use material. In one embodiment of the invention, the amount of polymerization catalyst employed is generally an amount from about 0.01 to about 10.0 mole percent, preferably from about 0.1 to about 2 mole percent, and more preferably from about 0.2 to about 0.6 mole percent, based on total moles of repeat units of the MPO.

In an alternative embodiment, the MPO-filler mixture does not contain polymerization catalyst. For example, the MPO-filler mixture may consist essentially of MPO and filler. This type of mixture gives rise to a "two-part" polymerization system, where the polymerization catalyst is provided separately. For example, the filler-MPO mixture can be added to a reaction vessel at a different time, or via a different mechanism, than the polymerization catalyst. In one embodiment, the filler-MPO mixture is extruded or injection-molded together with a separately-provided polymerization catalyst.

The mixtures of the invention may be used in any combination of one or more processes—for example (and without limitation), rotational molding, injection molding, powder coating, compression molding, extrusion, pultrusion, resin film infusion, solvent prepreg, hot melt prepreg, resin transfer molding, filament winding, and roll wrapping processes. Articles produced by these processes are encompassed within the scope of this invention. Examples of these processes are provided in co-owned U.S. Pat. No. 6,369,157, by Winckler et al., and co-owned U.S. Pat. No. 6,420,047, by Winckler et al., the texts of which are incorporated by reference herein, in their entirety. Depending on the type and proportion of filler, the MPO-filler mixtures of the invention exhibit moderately higher melt viscosities than unfilled MPO. Therefore, these mixtures may be particularly well-suited for use in low-pressure processes such as rotational molding, powder coating, low-pressure molding, gas-assist molding, short-shot molding, co-injection molding, reaction-injection molding, blow molding, thermoforming, and combinations thereof, where a higher melt viscosity is desired.

Examples of MPO-filler mixtures and polymer compositions formed from polymerization of the mixtures are described in the following Experimental Examples section.

IV. EXPERIMENTAL EXAMPLES

Examples 1-12 illustrate methods of preparing a stable, one-part, ready-to-polymerize, intimate physical mixture comprising an MPO, a filler, and a polymerization catalyst. Properties of the polymer compositions resulting from the polymerization of these mixtures are shown in Tables 2-5 and in FIGS. 1-3.

Examples 1-12 employ the use of macrocyclic polyester oligomers manufactured by Cyclics Corporation of Schenectady, N.Y., that are primarily composed of macrocyclic poly(1,4-butylene terephthalate) oligomer. The MPO used in Examples 1-3 is referred to herein as MPO-2 and contains about 93 mol. % (1,4-butylene terephthalate) units and about 7 mol. % (2,2'-oxydiethylene terephthalate) units. The MPO used in Examples 4-12 is referred to herein as MPO-3 and contains about 100 mol. % (1,4-butylene terephthalate) units. MPO-2 and MPO-3 each contain about 40.2 wt. % dimer species, about 39.0 wt. % trimer species, about 5.5 wt. % tetramer species, about 12.9 wt. % pentamer species, and about 2.4 wt. % higher oligomer species.

In one embodiment of the invention, the MPO of the blend material is a composition comprising from about 30 to about 45 wt. % dimer species, from about 30 to about 45 wt. % trimer species, from about 0 to about 10 wt. % tetramer species, and from about 5 wt. % to about 20 wt. % pentamer species. MPO formulations outside these ranges may be used, as well. Certain embodiments of the invention may include modifying compositions of MPO's. Various methods of modifying compositions of MPO's are described in co-owned U.S. Pat. No. 6,436,548, by Phelps, the text of which is incorporated by reference herein in its entirety.

Example 1

A first formulation containing 5 wt. % anhydrous magnesium silicate was prepared by melt-mixing 95.0 grams of MPO-2), 5.0 grams of Ultra Talc 609 (manufactured by Barretts Minerals Inc. of Barretts, Mont.), and 0.20 grams of stabilizer Irganox 1010 (CAS number 6683-19-8, manufactured by Ciba-Geigy Corp. of Ardsley, N.Y.). The three components were added in finely pulverized form into a 250-ml, three-neck flask fitted with a vacuum adapter and a magnetic stirrer. The flask was first flushed with argon and then heated under vacuum at 100° C. to dry the mixture. After an hour of drying, the flask was heated under vacuum in an oil bath maintained at 165° C. The mixture completely melted within about 30 minutes to form a homogeneous, clear liquid, indicating dissolution of the anhydrous magnesium silicate in the mixture. The flask was then transferred to another oil bath at 150° C., and stirred for 6 minutes as argon gas was introduced into the flask. Butyltin chloride dihydroxide powder (0.371 grams, 0.35 mol. % based on molar amount of total repeat units in MPO-2) was added over a period of about one minute. The resulting mixture was further stirred for an additional 10 minutes and was then poured onto an aluminum plate to quench. Upon cooling to room temperature, the solution became a transparent glass, indicating the silicate particles were dispersed in the mixture well enough to allow light to penetrate the mixture. The resulting tacky solid was annealed in an oven at 80° C. under vacuum for 2 hours to allow crystallization. The white solid was pulverized to obtain a one-part, ready-to-polymerize mixture containing 5 wt. % magnesium silicate.

Examples 2 and 3

Second and third formulations containing 10 wt. % and 20 wt. % magnesium silicate, respectively, were prepared following the procedures of Example 1. A control mixture containing no magnesium silicate was also prepared.

The ready-to-polymerize mixtures obtained in Examples 1-3 were polymerized under argon atmosphere by heating at 190° C. for 60 minutes in a rectangular mold. The resulting polymers were analyzed by gel permeation chromatography for molecular weight and polymerization conversion. The polymerization rate, ultimate percent conversion, and average polymer molecular weights were not significantly affected by the addition of the silicate. The results, as determined by gel permeation chromatography using polystyrene standards, are shown in Table 2.

TABLE 2

Polymerization of Talc-filled MPO Mixtures

| Sample | Talc (wt. %) | Conversion (%) | Mol. Weight GPC peak (Daltons) |
|---|---|---|---|
| Control | 0 | 91.7 | 138,000 |
| 1 | 5 | 95.8 | 121,000 |
| 2 | 10 | 97.2 | 112,000 |
| 3 | 20 | 92.1 | 117,000 |

Shear modulus and Young's modulus were obtained for these samples via ultra-sonic velocity measurement. Specimens for HDT measurement were cut from the control plaque and the plaque containing 10 wt. % talc (Sample 2). HDT measurements were obtained using ASTM method number D608-01 at 66 psi. The results are listed in Table 3, along with the specific gravity of each sample. The results show that specific gravity, shear modulus, and Young's modulus increase according to the amount of filler in the sample. The HDT for the talc-containing sample is significantly higher than the HDT for the control sample.

TABLE 3

Properties of Talc-filled Polymer Compositions

| Sample | Magnesium silicate (wt. %) | Specific gravity | Shear modulus (MPa) | Young's modulus (MPa) | HDT (° F.) at 66 psi |
|---|---|---|---|---|---|
| Control | 0 | 1.320 | 1.35 | 3.89 | 204 |
| 1 | 5 | 1.378 | 1.45 | 3.92 | — |
| 2 | 10 | 1.412 | 1.65 | 4.21 | 273 |
| 3 | 20 | 1.505 | 2.01 | 4.86 | — |

Example 4

A fourth formulation containing about 10 wt. % magnesium silicate was prepared by melt-mixing 90.0 grams of MPO-3, 10.0 grams of Ultra Talc 609, and 0.20 gram of Irganox 1010 stabilizer. The three components were added in finely-pulverized form into a 250-ml, three neck flask fitted with a vacuum adapter and a magnetic stirrer. The flask was first flushed with argon and then heated under vacuum at 100° C. for one hour to dry the mixture. The flask was then heated under vacuum in an oil bath maintained at 165° C. The mixture completely melted within 30 minutes to form a homogeneous, clear liquid. The flask was then transferred to another oil bath at 150° C., and stirred for 6 minutes as argon gas was introduced into the flask. Butyltin chloride dihydroxide powder (0.371 gram, 0.35 mol. % based on molar amount of total repeat units in MPO-3) was added over a period of one minute. The resulting mixture was poured into a rectangular mold and cured at 190° C. for 60 minutes. Samples for dynamic mechanical thermal analysis (DMTA) were cut from the cured plaque.

Example 5

A fifth formulation containing 30 wt. % magnesium silicate was prepared following the procedures of Example 4 using MPO-3. A control mixture containing no magnesium silicate was also prepared. Samples for DMTA testing were cut from cured plaques of both formulations.

Examples 6 and 7

A sixth formulation containing 60 wt. % milled glass fibers (200 micron, unsized, Microglass® 3032 manufactured by Fibertec Inc. of Bridgewater, Mass.) were prepared according to the procedure described for Example 4 (replacing the Ultra Talc of Example 4 with Microglass® 3032). A seventh formulation containing 30 wt. % milled glass fiber (1/16", sized, manufactured by Fibertec Inc.), and an unfilled control formulation were prepared as well. Samples for use in DMTA testing were cut from cured plaques of each formulation.

Dynamic mechanical thermal analysis (DMTA) was conducted on samples cut from the plaques prepared in Examples 4-7 using a three-point bending mode deformation at a deformation frequency of 10 Hz. The results are shown graphically in FIGS. 1-3, where the value E' represents storage modulus and "tan d" represents tangent delta (loss tangent), which is a measure of damping performance (ability of a material to dissipate energy).

FIG. 1 depicts DMTA results for the polymer compositions of Examples 4 and 5 containing 10 wt. % and 30 wt. % magnesium silicate, respectively, along with the unfilled control. The polymer compositions of Examples 4 and 5 exhibit higher elastic modulus (E') over a broad temperature range (from about 25° C. to about 160° C.) than the control sample, indicating grater heat resistance (HDT), improved processability, increased stiffness, and greater strength due to the presence of the well-dispersed filler in the polymer matrix. There is typically a trade-off between E' and hysteresis (as measured by the total area under the tangent delta curve), depending on the total amount of filler used. However, the proportionate increase in E' for the talc-filled polymer compositions of Examples 4 and 5 is significantly greater than the proportionate increase in hysteresis, and the trade-off between E' and hysteresis may be entirely acceptable for many applications.

Figure 2:
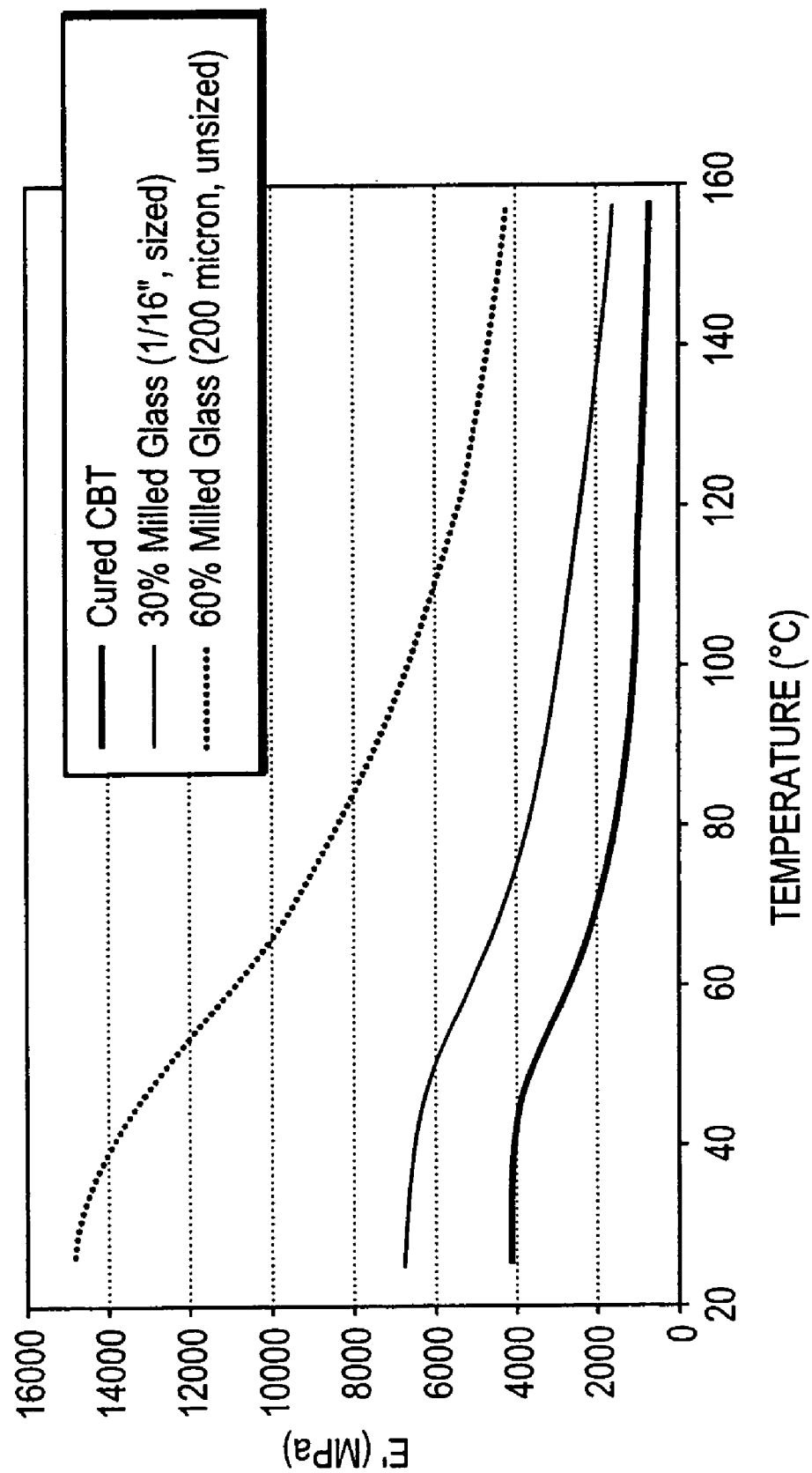
FIG. 2 shows a graph depicting results of DMTA tests of illustrative polymer compositions of the invention containing 0 wt. %, 30 wt. %, and 60 wt. % milled glass.
Figure 3:
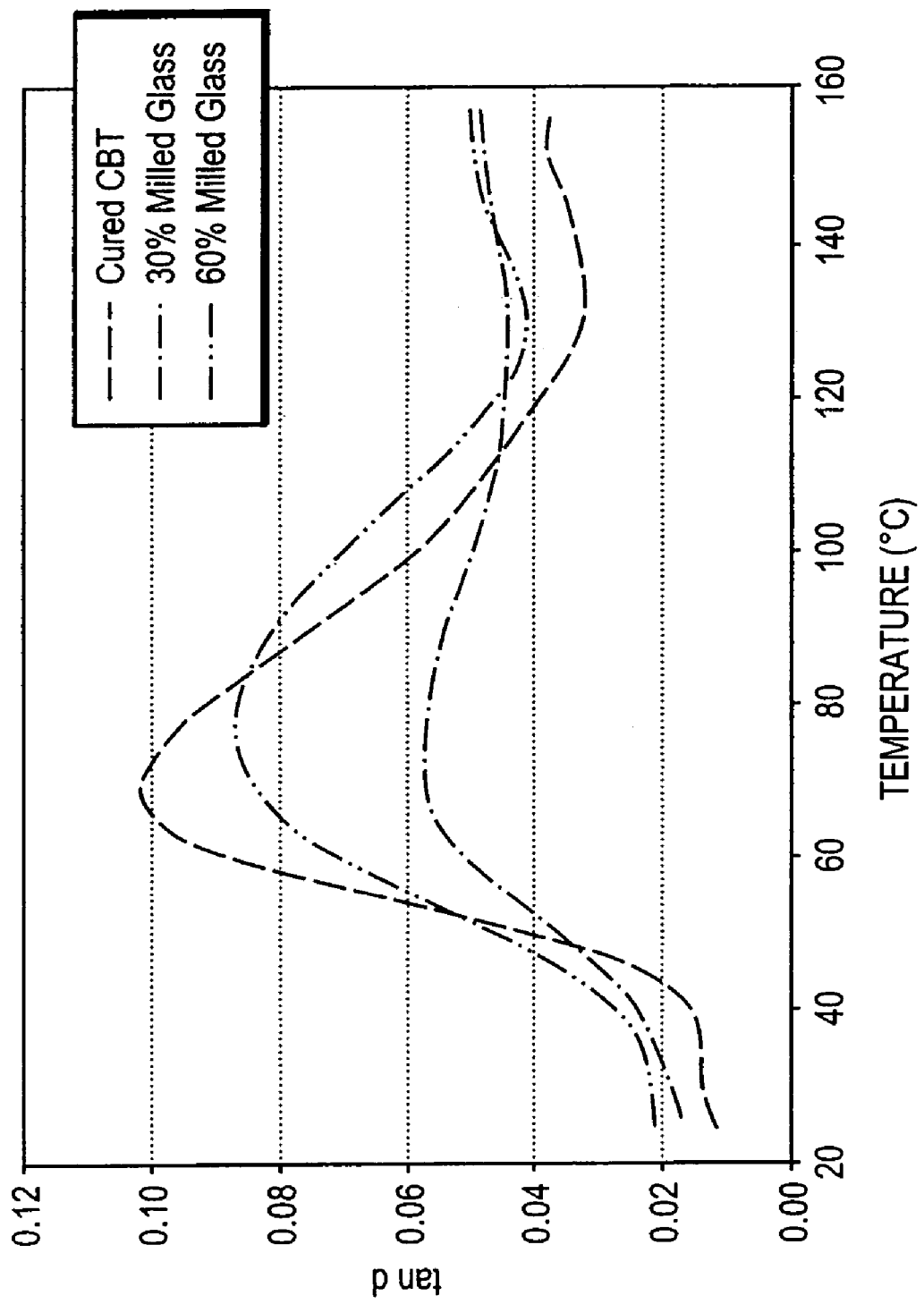
FIG. 3 shows a graph depicting further results of DMTA tests of illustrative polymer compositions of the invention containing 0 wt. %, 30 wt. %, and 60 wt. % milled glass.

FIGS. 2 and 3 show graphs depicting DMTA results for the polymer compositions of Examples 6 and 7 containing 30 wt. % and 60 wt. % milled glass fiber, respectively, along with the control sample containing no filler. The polymer compositions of Examples 6 and 7 exhibit significantly higher elastic modulus (E') over a broad temperature range (from about 25° C. to about 160° C.) than the control sample, indicating grater heat resistance (HDT), improved processability, increased stiffness, and greater strength due to the presence of the well-dispersed filler in the polymer compositions. FIG. 3 indicates the filled polymer compositions of Examples 6 and 7 have a lower tangent delta than the unfilled control sample over a significant portion of the temperature range tested. A lower tangent delta generally indicates higher resilience and lower hysteresis.

Examples 8, 9, and 10

Three different formulations containing 60 wt. % glass spheres (glass spheres with untreated surfaces, having average diameter of 0.1-0.2 mm and bulk density of 1.6 g/cm$^3$), 60 wt. % unsized milled glass fiber (Microglass® 3032, manufactured by Fibertec Inc. of Bridgewater, Mass.), and 60 wt. % sand (Quickrete Commercial Grade Fine Sand, Product No. 1961-52, manufactured by Quikrete Company of Atlanta, Ga.), respectively, were prepared according to the procedure described for Example 4 (replacing the Ultra Talc of Example 4 with the respective fillers above, and using MPO-3 as the MPO). Flexural strength tests (ISO 178 standard test method) and impact strength tests (Charpy impact strength) were conducted on samples cut from plaques of the formulations containing glass spheres, glass fiber, and sand, respectively (Examples 8-10). The results are summarized in Table 4. The milled-glass-filled sample shows significantly greater strength than the other filled samples. The milled glass filler has a higher aspect ratio than the sand and glass spheres.

TABLE 4

Effects of Filler Type in Polymerized MPO-3 on Flexural and Impact Strength (60 wt. % filler)

| | Sample | | |
|---|---|---|---|
| Test | Glass spheres (Ex. 8) | Unsized milled glass (Ex. 9) | Sand (Ex. 10) |
| Flexural Strength [N/mm$^2$] | 35.6 | 103 | 22.3 |
| Impact Strength [mJ/mm$^2$] | 3.1 | 13.2 | 3.2 |

Examples 11 and 12

A 100-mm diameter cylindrical mold was fitted with a 44-mm steel core positioned along the center axis. Two separate parts were molded by polymerizing MPO-3 filled with 15 wt. % talc (Ultra Talc 609 manufactured by Barretts Minerals Inc. of Barretts, Mont.) and 60 wt. % milled glass fiber (Microglass® 3032, manufactured by Fibertec Inc. of Bridgewater, Mass.), respectively. In addition, two "control" parts were molded—one control part made by polymerizing a mixture of MPO-3 with 5 wt. % polycaprolactone (Tone™ P-767, manufactured by Dow Chemical Company of Midland, Mich.) and a second control part made by polymerizing unfilled MPO-3.

The mixtures of MPO-3, polymerization catalyst, and (where applicable) filler were prepared according to the procedure described in Example 4 (substituting the appropriate filler), except that the MPO-3 mixtures were melted at about 170° C. and the time from introduction of the catalyst into the mixture until transfer of the mixture into the mold was about 90 seconds. In each experiment, a vacuum of about 10 mm Hg was maintained in the mold during resin transfer, and the mold was cured at about 240° C. for about 90 minutes. The mold was removed to an ambient temperature environment, and quench cooled with water spray and application of a wet towel.

The parts made with 15 wt. % talc, 60 wt. % milled glass fiber, and 5 wt. % polycaprolactone (an anti-cracking agent), respectively, had no apparent cracks on their surfaces. Conversely, the part made by polymerizing unfilled MPO-3 had visible surface cracks. Thus, use of talc and/or milled glass that is well-dispersed in MPO-3 according to embodiments of the invention can serve to prevent or reduce cracking on the surface of molded parts.

A Shore durometer test was conducted on the parts made with 15 wt. % talc, 60 wt. % milled glass fiber, and 5 wt. % polycaprolactone, respectively. In accordance with the DMTA modulus data in FIGS. 1 and 2, the durometer Shore D hardness value was highest for the milled-glass-filled MPO-3 part, followed by the part filled with talc, and the polycaprolactone-filled part had the lowest hardness value. Table 5 summarizes the results of the Shore durometer tests.

TABLE 5

Durometer Shore D Hardness of Three Different Cast Roller Parts.

| | Durometer Shore D hardness |
|---|---|
| Polycaprolactone-filled MPO-3 part (control) | 75 |
| Talc-filled MPO-3 part (Ex. 11) | 78 |
| Milled glass filled MPO-3 part (Ex. 12) | 88 |

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A mixture comprising:
   (a) a macrocyclic polyester oligomer; and
   (b) a mineral having a substantially charge-neutral surface.

2. The mixture of claim 1, wherein the mixture is an intimate physical mixture.

3. The mixture of claim 1, wherein the mixture is a nanocomposite.

4. The mixture of claim 1, wherein the macrocyclic polyester oligomer comprises at least one monomer repeat unit selected from the group consisting of 1,4-butylene terephthalate, 1,3-propylene terephthalate, 1,4-cyclohexylenedimethylene terephthalate, ethylene terephthalate, and 1,2-ethylene 2,6-naphthalenedicarboxylate.

5. The mixture of claim 1, wherein the macrocyclic polyester oligomer comprises macrocyclic poly(1,4-butylene terephthalate) oligomer.

6. The mixture of claim 1, wherein the mineral is a layered mineral.

7. The mixture of claim 1, wherein the mineral comprises at least one member selected from the group consisting of molybdenum sulfide, graphite, magnesium, iron, calcium, potassium, sodium, manganese, titanium, zirconium, copper, berylium, and zinc.

8. The mixture of claim 1, wherein the mineral comprises a layered silicate.

9. The mixture of claim 8, wherein the layered silicate is talc.

10. The mixture of claim 8, wherein the layered silicate is anhydrous.

11. The mixture of claim 1, further comprising a polymerization catalyst.

12. The mixture of claim 11, wherein the mixture is stable at ambient temperature for at least one week.

13. The mixture of claim 11, wherein the mixture is stable at ambient temperature for at least one month.

14. A polymer composition resulting from the polymerization of the macrocyclic polyester oligomer of the mixture of claim 11.

15. The mixture of claim 1, wherein the mineral is present in the mixture in an amount of at least about 10 weight percent.

16. The mixture of claim 1, wherein the mineral is present in the mixture in an amount of at least about 20 weight percent.

17. The mixture of claim 1, wherein the mineral is present in the mixture in an amount of at least about 50 weight percent.

18. A nanocomposite comprising a macrocyclic polyester oligomer and a mineral having a substantially charge-neutral surface.

* * * * *